Jan. 19, 1954  W. W. WHITE  2,666,256
TOOL FOR BRAKE SHOE RETRACTING SPRINGS
Filed Feb. 23, 1950  2 Sheets-Sheet 1
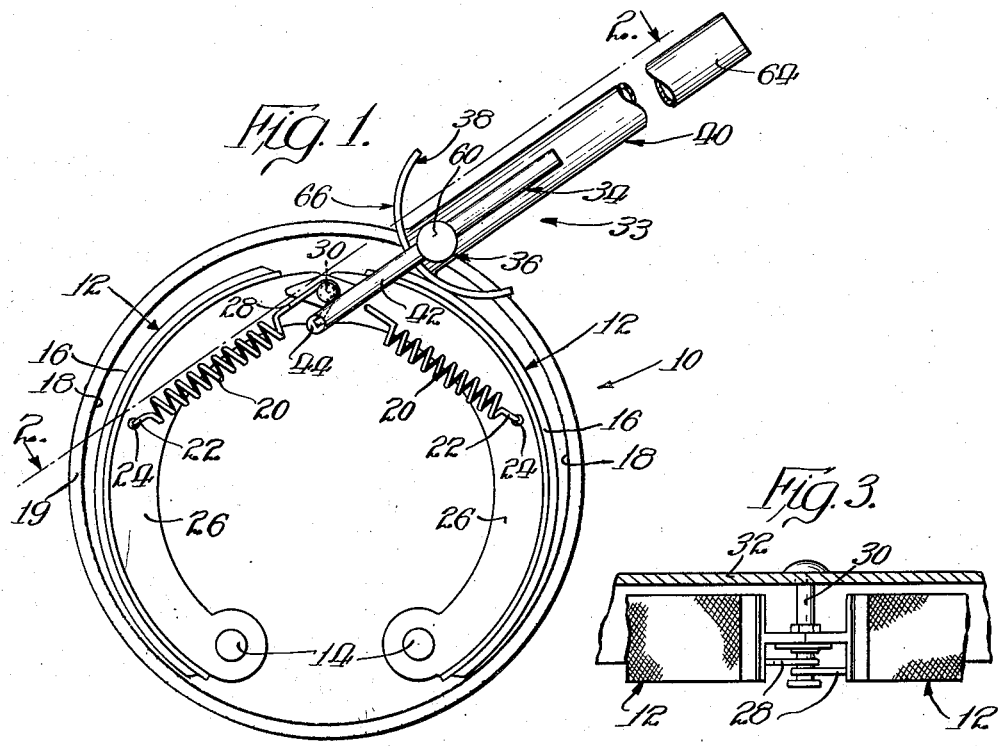
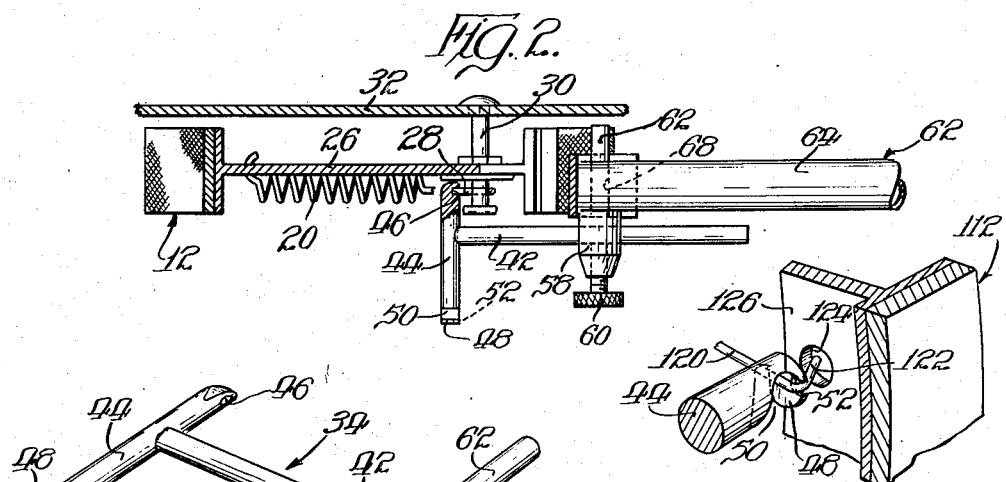
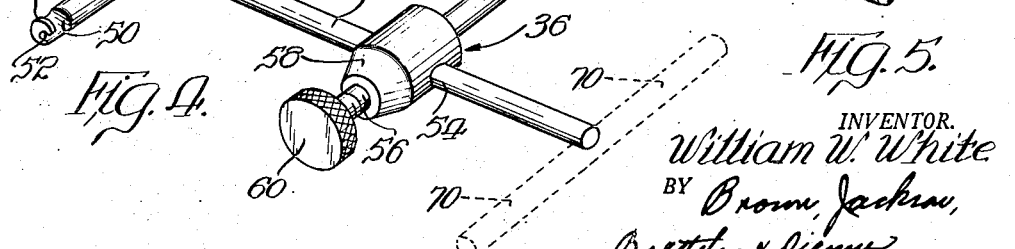
INVENTOR.
William W. White Jan. 19, 1954 W. W. WHITE 2,666,256
TOOL FOR BRAKE SHOE RETRACTING SPRINGS
Filed Feb. 23, 1950 2 Sheets-Sheet 2
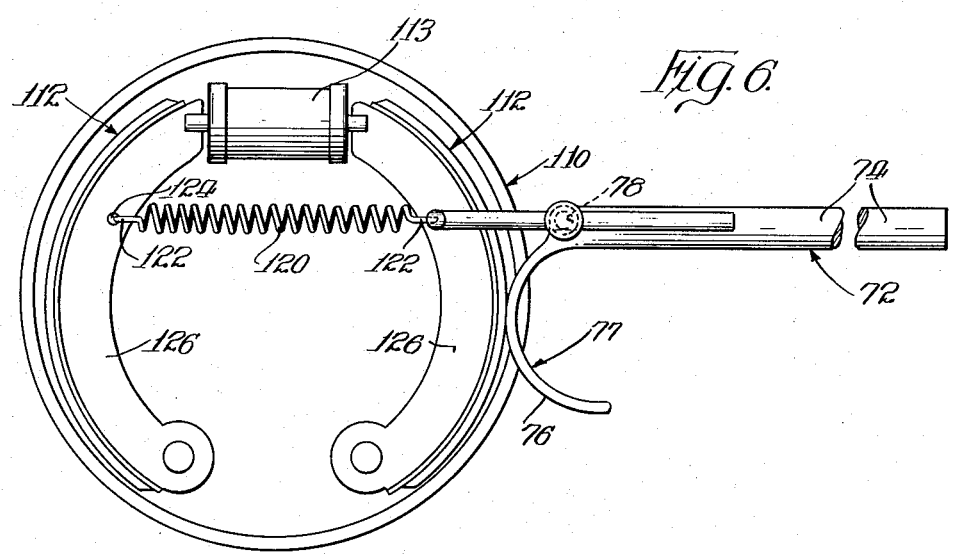
INVENTOR.
William W. White
BY Brown, Jackson,
Boettcher & Dienner
Attys:

Patented Jan. 19, 1954

2,666,256

UNITED STATES PATENT OFFICE 2,666,256

TOOL FOR BRAKE SHOE RETRACTING
SPRINGS

William W. White, Evanston, Ill.

Application February 23, 1950, Serial No. 145,709

3 Claims. (Cl. 29—227)

This invention pertains to a tool for securing the hooked ends of springs either in apertures or on posts and it is particularly well adapted for use with springs employed for retracting brake shoes of automobile or truck brakes.

On August 9, 1949, applicant filed an application for patent entitled "Tool for Brake Shoe Retracting Spring," which application is identified as Serial No. 109,271.

It is an object of this invention to provide a tool which will remove or replace brake shoe springs, and the like, easily and without danger of the springs snapping away from the tool.

It is another object of the invention that the tool be adaptable for use with brake shoe springs of different types of brakes, as well as with brakes of different sizes.

It is a further object of the invention to provide such a tool as will be able to remove or replace brake shoe springs, even though they may be located behind other mechanisms, or in such locations as are not readily accessible to the usual form of tools or to the hand of a person seeking to work with the springs.

The tool of the invention has further advantages in that it may be easily formed of inexpensive materials and with few parts, while yet being strong and able to take rough treatment such as that frequently accorded garage service tools.

It is a further advantage of the invention that it may be employed to operate either from the right-hand side or left-hand side of a spring.

Further objects, uses and advantages of the invention will become apparent, or be obvious, from the following written description, when taken with the drawings, in which:

Figure 1 is a side elevation of one type of brake with the tool of my invention being employed;

Figure 2 is a sectional view on the line 2—2 of Figure 1;

Figure 3 is a fragmentary top plan view of the brake of Figure 1;

Figure 4 is an enlarged perspective view of the C-shaped link including the connecting element and the pull rod of Figures 1 and 2, a possible modification of the latter being shown in dotted lines;

Figure 5 is a fragmentary perspective view of the spring-engaging end of the C-shaped link of Figure 4 employed in connection with a different type of brake, such as that shown in Figure 6; and Figure 6 is a side elevational view of a modified actuating mechanism for the tool of my invention with the tool being disposed for use in connection with a brake different than that shown in Figure 1, The tool of my invention comprises essentially two main parts, first, a bent lever, and, second, a C-shaped link having one end or point of the C pivoted to the lever by a pivot pin attached to and forming a part of the link, and lying in the same plane as the rest of the link.

The lever has two arms, a power arm and a curved fulcrum arm. The lever is of the second class, as will be hereinafter disclosed in detail. The lever fulcrums upon or against the outside cylindrical surface of one brake shoe in order to pull upon a spring attached to the other brake shoe to release the spring or to replace it.

An essential feature of the lever is a cylindrical socket or pivot bearing to provide a pivotal connection between the C-shaped link and that end of the power arm which joins the fulcrum arm. This pivot bearing is preferably a sleeve or tubular socket open at both ends for the insertion of a pivot pin attached to or forming part of one end or point of the C-shaped link, as above explained. This sleeve or socket forming the pivot bearing is at the end of the power arm of the lever adjacent the junction of the power arm and the fulcrum arm. The axis of the sleeve or socket lies substantially at right angles to the plane of the lever.

The C-shaped link has the aforesaid pivot pin extending from or forming part of the one end or point of the C and the pin is disposed in the plane of the C-shaped link. The outer point or end of the C-shaped link registers with the central part of the pin, that is, it lies in a plane at right angles to the axis of the pin and between the ends thereof, and when the pin is in the bearing socket, said end lies substantially in the plane of the bent lever. This outer end of the link has a recess or socket to receive and engage the end of the spring which is to be manipulated. The spring while held under tension cannot escape from said recess or socket. The link is C-shaped, so that its pivot pin may be hinged to the end of the working arm and the body of the link can then reach around the flange of the brake shoe and extend in toward the web of the brake shoe and engage the spring in approximately the plane of the lever.

For manipulating a spring from the right hand side, the pivot pin of the C-shaped link may in one embodiment be entered into the pivot bearing from one side, and for manipulating a spring from the left hand side, the C-shaped link is reversed, and the pivot pin of the said C-shaped link is entered into the pivot bearing from the other side. In another embodiment the lever comprises a power arm and two divergent curved fulcrum arms with the pivot bearing or socket for the pivot pin of the C-shaped link disposed substantially at the junction of the power arm with said fulcrum arms. In either event, the spring engaging end of the C-shaped link, which is the free end thereof, swings in a plane which is substantially the same as or closely adjacent and parallel to the plane of the bent lever.

I dispose the end of the link carrying the spring engaging recess in register with the central part of the pin, i. e., between the ends thereof, and I dispose the bearing sleeve or socket substantially in register with the fulcrum arm or arms, and hence, there is no tendency for the tool to slip off sidewise when the spring is engaged and tensioned.

In the preferred form of my invention, the lever has a curved fulcrum arm to engage the curved surface of the brake shoe which curved fulcrum arm of the lever forms a rocking or shifting fulcrum.

The C-shaped link may be constructed of connected parts or elements adjustable relative to each other, particularly for operating upon brakes of different diameter. The spring engaging end of the C-shaped link may be suitably formed for engaging the end of the spring to be attached to or detached from its anchorage whether the anchorage be a stationary post or be a hole in the web of a brake shoe, as hereinafter described.

Referring now to Figures 1 through 5, and particularly Figure 1, there will be seen a brake mechanism, indicated generally by the reference numeral 10, which includes a pair of brake shoes, each indicated generally by the reference numeral 12. Each brake shoe is pivotally mounted on the brake plate by a pin 14 and is adapted to be moved outwardly by actuating mechanism (not shown) which may be of a mechanical or hydraulic type to engage the brake blocks 16 of the shoes with the inner surface 18 of the brake drum 19 shown in dotted lines in Figure 1. The shoe actuating mechanism must act against the action of the springs 20, each of which is connected by one hooked end 22 in an aperture 24 of the web 26 of the brake shoe 12 and by the other hooked end 28 about a post 30 which is fixedly secured in the rear wall 32 of the drum 19. The springs tend to retract the brake shoes and withdraw them from the inner surface 18 of the brake drum when the actuating mechanism is not employed or is released. The springs are strong and are under considerable tension and are difficult to remove from the posts 30 or apertures 24.

The tool of my invention is well adapted to easily and safely remove the springs without danger of their snapping away during the removal from the post 30. This tool, indicated generally by the reference numeral 33 in Figures 1 through 5, comprises, essentially a C-shaped link made up of connected parts, namely, a pull rod, indicated generally by the reference numeral 34, a connecting element, indicated generally by the reference numeral 36, which connecting element includes a pivot pin 62 for the C-shaped link and transversely extending bar 44 terminating in a spring-engaging portion having the recess 46; and, second, a bent lever comprising a power arm and a curved fulcrum arm lying in the same plane, said lever including in its structure a fulcrum member, indicated generally by the reference numeral 38, which fulcrum member 38 comprises a pair of curved fulcrum arms extending away from the pivot, each fulcrum arm being capable of functioning as a travelling fulcrum and an actuating handle 64 connected to the fulcrum member 38, said bent lever being indicated generally by the reference numeral 40.

Turning to Figure 4, it will be seen that the C-shaped link between the lever 40 and the spring to be removed, which link includes the pull rod 34 has one portion, or arm, 42 and a second portion, or arm, 44 which is disposed at an angle to the first mentioned portion. The arm 44 extends to either side of the end of arm 42 and has a socket 46 at one end and a hook 48 at the other end, the space 50 between the hook 48 and the body of arm 44 being of such width as to fit readily over a straight wire portion adjacent the hooked end of a spring in the brake mechanism 10. Incorporated in the hook 48 is a notch 52 which is adapted to fit about the wire forming the hooked end of a spring 20, as may be more readily seen in Figure 5. The notch 52 will prevent a wire from slipping away from the hook 48. The space 50 may be formed by drilling a circular hole, which intersects the outer surface of the arm 44 and provides a gap wide enough to pass over the straight wire portion at the hooked end of a spring, or otherwise forming it.

The socket 46 serves as a spring-engaging and retaining recess from which the engaged end of the spring cannot escape so long as the C-shaped link is supported by an even sidewise pull upon the pivot pin 62. Similarly, the notch 52 serves as a spring engaging and retaining recess when it is brought around into register with the pivot pin 62 and engages the end of the spring in the manner illustrated in Figure 5.

When either recess is brought into working position, the arm 44 will lie in the same plane with the rod 42 and pivot pin 62, so that all parts of this C-shaped link lie in a common plane, and that plane will be at right angles to the plane of the bent lever 40, which bent lever includes the handle portion 64 and the rocker or fulcrum member 38, these parts making up the power arm which extends from the handle to the fulcrum point upon which the member 38 rests, and the work arm which extends from the pivot bearing 68 to the fulcrum point defined by contact of said member 38 with a supporting member.

The connecting element, indicated generally by the reference numeral 36, which connecting element permits adjustment of the effective length of the C-shaped link has a bore 54 which provides a pivotal bearing in which the arm 42 is adapted to be able to slide and rotate. A cross bore 56 extends from one end of the body 58 of the connecting element to the bore 54. Bore 56 is internally threaded to accommodate the set screw 60 which may be threaded into said bore and into engagement with the arm 42 of pull rod 34 to fix said arm 42 relative to the connecting element 36 for adjustment of the length of the C-shaped link for brakes of different diameters. From the opposite side of the body 58 there extends a shaft or pivot pin 62, substantially at right angles to the bore 54, and said pivot pin 62 is adapted to be pivotally connected with the outer end of the work arm of the actuating lever 40 in a manner which will now be described.

The actuating lever 40 may, for example, take the form of a piece of tubing having a handle 64 at one end, the other end of which has been split and the split ends of which have been turned back and flattened to provide a curved fulcrum surface, indicated generally by the reference numeral 66. The fulcrum surface 66 is thereby adapted to extend to either side of the handle 64 and will provide a shifting fulcrum. Adjacent the fulcrum surface 66 and substantially centrally of the tubular shaft and crosswise thereof, there is provided a pivotal bearing 68 in the form of two aligned holes in the tubular handle 64. (See Figure 2.) In the pivotal bearing 68 the pivot pin 62 of the connecting element 36 is adapted to fit. If desired, a spring pressed ball detent may be employed on the outer end of pivot pin 62, which detent will tend to keep the connecting element associated with the pivotal bearing 68 in the handle 64.

By the aforesaid arrangement, the plane of the C-shaped link will be at right angles to the plane of the bent lever and the spring engaging recess either 46 or 52, as the case may be, lies in register with the central part of the pivot pin, so that as shown in Figure 2 the said end of the C-shaped lever which contains the desired spring engaging recess will be free to swing on its pivot pin 62 in substantially the plane of the bent lever. Thereby a powerful pull may be exerted upon the spring without any tendency of the lever to slip off of the supporting surface or tilting sidewise.

In employing the tool 33 of my invention in conjunction with a brake mechanism such as that shown in Figures 1, 2 and 3, the user will first insert the very end of the hooked end 28 of the spring into the socket or recess 46 with the handle 64 of the tool extending away from the spring and generally parallel to the arm 42 of the pull rod 34. The fulcrum surface 66 will then be rested on the brake shoe 12 opposite from the spring which is to be removed. Depending upon the particular size of the brakes involved, it may be necessary to loosen the set screw 60 of the connecting element 36 in order to shift the connecting element along the arm 42 in order to conveniently locate the fulcrum 66 on the brake shoe 12. When so located, the set screw is tightened up again and, with the shaft 62 of the connecting element in the pivotal bearing 68 of the handle 64, the user is ready to actuate the handle 64 in a clockwise direction which will cause the pull rod to be drawn generally toward the right to stretch the spring 20 to the point where the free end of the spring which rests in the socket 46 is clear of the post 30. The user may then rock the tool outwardly (outwardly as viewed in Figure 1 and coming out of the page) by its handle about an edge of the fulcrum surface 66 to bring the end 28 of the spring 20 entirely free of the post. The fulcrum surface can then be rocked back into flat engagement with the brake shoe 12 as the handle is permitted to move in a counter-clockwise direction under the urging of the spring 20 which has just been stretched. The spring will then assume a position wherein it is no longer under tension. It may then be easily disengaged from the socket 46 of tool 33 and also, if desired, from the aperture 24 in the web of the shoe 12. A generally similar procedure, with the steps reversed, is involved in re-engaging the hooked end 28 of a spring over a post such as the post 30.

After removal of spring 20 on the left side of the brake structure 10, as viewed in Figure 1, the user may then desire to remove the other spring. It is then only necessary to shift the fulcrum surface 66 over to the other brake shoe after engaging the hooked end of the second spring in the socket 46 of the pull rod 34. Similar actuation of the tool will then permit removal of the second spring. The spring end which lies outermost relative to the end of the post 30 is first removed and then the other spring end is engaged and unhooked from post 30.

Assuming now that the tool has been used on a brake mechanism 10 such as that shown in Figure 1, the next brake encountered by the user may be that illustrated in Figures 5 and 6 and indicated generally by the reference numeral 110. In this form of brake mechanism the brake shoes 112 are adapted to be moved outwardly by an actuating mechanism 113 against the opposition of the single spring 120 which has each of its hooked ends 122 engaged in an aperture 124 in the webs 126 of the brake shoes 112. The spring 120 may, of course, be removed from either end, thereby rendering it ineffective with respect to both shoes.

To employ the tool 33 of Figures 1 through 3 on the spring 128, it is only necessary that the pull rod 34 be rotated about its own axis 180° from the position shown in Figure 1 in order to rotate the hook 48 into position, i. e., into the plane of rod 42 and pin 62. This may be done by first releasing the set screw 60 of the connecting element 36. The hook 48 is passed over the straight wire portion of the hooked end 122 of spring 120 and is pulled to the right, as viewed in Figures 5 and 6, until the notch or recess 52 in the hook 48 fits about the wire at the curve of the hooked end, as best shown in Figure 5. The fulcrum surface 66 of the lever is then rested upon brake shoe 112 in a manner similar to that shown either in Figure 1 or 6 and clockwise rotation of the handle of the tool will then draw the hooked end 122 of spring 120 to the right, as viewed in Figure 6, whereupon a sideways or outward rocking of the tool about an edge of the fulcrum surface 66, as described above with respect to Figures 1 through 3, will draw the hooked end of the spring out of the aperture 124. The handle may then be permitted to rotate in a counter-clockwise direction in response to the tension of the spring and the tool may then be separated from the spring.

The notch or recess 52 in the hook 48 is adapted to prevent the hooked end of the spring from disengaging from the hook 48 of the link so that the spring will not snap away when released from the brake shoe. The notch or recess 52 is also useful during re-engagement of the hooked end of the spring with the aperture 124, since it permits the link to securely engage that hooked end without having the spring snap loose from the hook 48 of the link.

In order to switch over the tool of my invention from one type of braking mechanism to another, there could be employed in place of the connecting element 36 a round shaft 70 (see Figure 4) which is indicated in dotted outline as being secured to the opposite end of arm 42 from the end on which arm 44 is connected. The arm 70 would extend to either side of arm 42 and the extension on one side would form a pivot pin to be inserted into the pivotal bearing socket 68 of the work arm of the lever, if the socket 46 were desired, and the other extension or pivot pin would be employed if the hook 48 were desired. Such arrangement would not, however, as readily accommodate brakes of varying sizes as would the use of an adjustable connecting element such as that indicated by the reference numeral 36.

In Figure 6 the same type of C-shaped link including pull rod 34 and connecting element 36 are employed as those shown in Figures 1 through 4, but the actuating means 72 in the form of a bent lever having handle 74, which is either tubular or solid rod, is a modification. The fulcrum surface 76 is formed on the fulcrum member, indicated generally by the reference numeral 77, which is integral with the end of the handle 74. A pivotal bearing 78 is formed in the end of the handle 74 at its junction with the rocker-shaped fulcrum member 77, or the bearing 78 may be disposed in the arm of the rocker shaped fulcrum member 77 adjacent where it connects with the end of handle 74. In this form of the invention, it will be seen that the fulcrum surface 76 in which a shifting fulcrum is provided is disposed only on one side of the handle 74, instead of on both sides, as shown in the tool 33 of Figure 1. This lever 72 is a bent lever of the second class. The load, consisting of the C-shaped link, is pivoted in bearing 78 which lies between the power applying handle and the fulcrum. The fulcrum arm is the actual point of contact between the curved fulcrum portion 76 of the lever and the particular supporting surface upon which the curved portion 77 rests. In Figure 6, the supporting surface is the curved face of the brake shoe. The two arms of the lever 72 thus consist of the power arm extending from the point on handle 74 where the power is applied to the fulcrum, i. e., the point where the rocker shaped fulcrum member 77 rests upon the supporting surface; and the load or work arm extending from said same point of contact on the curved fulcrum member to the pivotal bearing 78. The operation of the tool of Figure 6 is the same as that of the tool 33 when employed on a brake mechanism 110 such as that shown in Figure 6. Where it is desired to employ the tool of Figure 6 on a brake mechanism 10 such as that illustrated in Figure 1, the operation is the same as that employed in describing the operation of tool 33 of Figure 1, it only being necessary to rotate the pull rod 34 in its pivotal bearing 54 in the connecting element 36 in order to bring the end of arm 44 which has the socket 46 into position for engagement with the very end of spring 20. Thereby in effect the engaging end of the C-shaped link has the hook 48 and recess 52 substituted for the recess 46.

While I have shown preferred forms of the invention, I do not intend to be limited to any of the illustrated embodiments, except insofar as the following claims are so limited, since modifications or changes coming within the scope of the invention will suggest themselves to others by reason of my disclosure.

I claim:

1. In a tool of the class described, a lever comprising a handle member and an arcuate fulcrum member rigidly connected with the handle member, said handle member and fulcrum member lying in substantially the same plane, there being a tubular bearing member rigidly connected to said handle and fulcrum member adjacent their connection, the axis of the tubular bearing member lying at substantially right angles to the plane of the handle and fulcrum members, a C-shaped link having a pivot pin at one extremity, said pivot pin being journaled in said tubular bearing member, the opposite extremity of said C-shaped link having a spring-engaging portion comprising a recess disposed substantially in the plane of said handle and fulcrum members, said C-shaped link lying in a plane which is disposed at all times at substantially right angles to said first named plane.

2. The tool of claim 1 characterized by said C-shaped link 34 being substantially rectangular in configuration, the two extremities comprising parallel rodlike members 62 and 64 and the spring engaging portion having a transverse groove 50 in the side of the rod adjacent its end and having a longitudinal groove 52 connecting with said groove 50, said grooves forming the spring engaging portion into a hook 48 for engaging the hooked end portion of a brake spring.

3. The tool of claim 1 characterized by said C-shaped link 34 being substantially rectangular in configuration, the two extremities comprising parallel rodlike members 62 and 44 and the spring engaging portion of member 44 having a socket 46 for receiving the free end of the hooked portion of a brake spring.

WILLIAM W. WHITE.

References Cited in the file of this patent

UNITED STATES PATENTS

| Number | Name | Date |
|---|---|---|
| 317,163 | McCaslin | May 5, 1885 |
| 543,290 | Cardwell | July 23, 1895 |
| 650,186 | Maxson | May 22, 1900 |
| 1,380,196 | Erickson | May 31, 1921 |
| 1,576,290 | Lenormand | Mar. 9, 1926 |
| 1,951,953 | Tollobitsch | Mar. 20, 1934 |
| 1,953,930 | Dyal | Apr. 10, 1934 |
| 2,441,696 | Feingold | May 18, 1948 |
| 2,474,940 | Hansen | July 5, 1949 |
| 2,490,160 | Riccio | Dec. 6, 1949 |
| 2,507,622 | Brugmann | May 16, 1950 |